Figure 1:
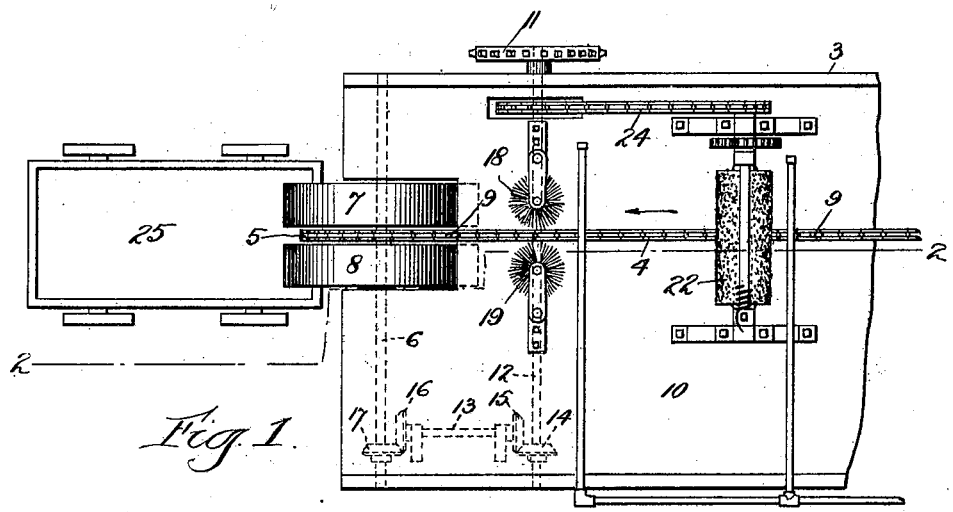

No. 644,400. Patented Feb. 27, 1900.
M. E. BROOKS.
MACHINE FOR SCRUBBING OR WASHING MEATS.
(Application filed Jan. 29, 1898.)

(No Model.)

Witnesses

Inventor
Maynard E. Brooks,
By Bond Adams Pickard Jackson.
Attys

UNITED STATES PATENT OFFICE.

MAYNARD E. BROOKS, OF CHICAGO, ILLINOIS, ASSIGNOR TO THE SWIFT & COMPANY, OF SAME PLACE.

MACHINE FOR SCRUBBING OR WASHING MEATS.

SPECIFICATION forming part of Letters Patent No. 644,400, dated February 27, 1900.

Application filed January 29, 1898. Serial No. 668,385. (No model.)

*To all whom it may concern:*

Be it known that I, MAYNARD E. BROOKS, a citizen of the United States, residing at Chicago, in the county of Cook and State of Illinois, have invented a certain new and useful Improvement in Machines for Scrubbing or Washing Meats, of which the following is a specification, reference being had to the accompanying drawings.

My invention relates to machines for washing or scrubbing pieces of meat—such, for instance, as hams—and has for its object to provide certain improvements in machines of this character, my improvements relating particularly to the mechanism for delivering the meats from the carrier by which they are conveyed while subjected to the washing or scrubbing devices.

In the accompanying drawings I have illustrated my improvement as applied to a meat-scrubbing machine of the type illustrated in Letters Patent of the United States No. 554,707, to William W. Michner, dated February 18, 1896, in which the ham or other piece of meat is conveyed by a suitable endless belt between horizontal and vertical scrubbing-brushes; but it should be understood that while my improvement is well adapted for application to a machine of the type illustrated it is not necessarily limited to use with machines having the scrubbing devices arranged and operating as described in said patent.

In machines of the type referred to it is customary to convey the ham or other piece of meat through the machine by providing the carrier-belt with a plurality of arms or lugs adapted to receive the thongs usually secured to one end of the piece of meat, the meat being thereby drawn along between the scrubbing devices as the carrier moves. For the purpose of releasing the pieces of meat after they have been scrubbed stationary curved shields or guides have heretofore been provided arranged to intercept the meat as it moved along and designed to raise it high enough to release the thongs from the carrier-arms. This construction, however, I have found to be very unsatisfactory and inefficient in operation, as frequently the pieces of meat are not properly released from the carrier, and consequently are carried around the end of the carrier and damaged. Furthermore, where the pieces of meat are properly detached from the carrier by said shields they remain upon the shields, interfering with the release of subsequent pieces of meat and necessitating the employment of a man to remove them, so that the machine may properly operate. I have discovered that by providing the carrying devices with detaching and delivery mechanism which acts positively to raise the pieces of meat and detach them from the carrier and then deliver them into a suitable receptacle placed to receive them the objections above pointed out may all be overcome and the use of an extra hand entirely dispensed with.

In its best form my improved detaching and delivery mechanism consists of a pair of revolving cylinders or wheels placed one at each side of the carrier near the delivery end thereof, said cylinders being arranged to project a short distance above the upper ends of the carrier-arms. By this construction when the pieces of meat arrive at the cylinders they are positively carried up until the thongs by which they are connected to the carrier-arms are detached from said arms, when the pieces of meat are carried over by the cylinders and discharged upon the floor or into a receptacle placed to receive them, the operation being thus made entirely automatic.

Figure 2:
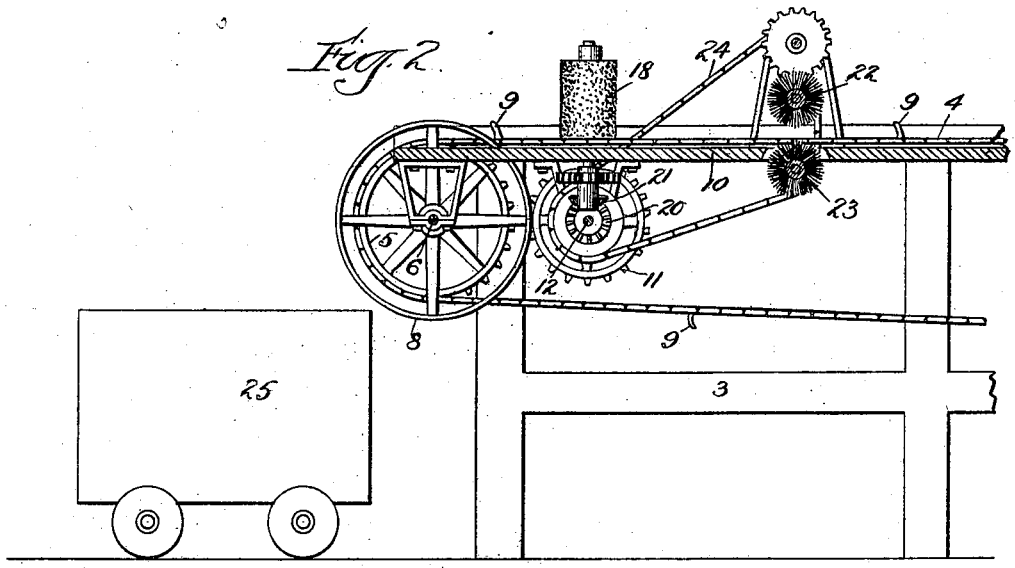

Referring to the accompanying drawings for a more detailed description of my invention, Figure 1 is a plan view, and Fig. 2 a vertical section, on line 2 2 of Fig. 1.

3 indicates the frame of the machine, and 4 an endless belt or carrier by which the pieces of meat are conveyed between the scrubbing devices.

5 indicates a sprocket-wheel arranged at the delivery end of the carrier upon a suitable shaft 6, which wheel carries one end of the carrier 4.

7 8 indicate cylinders or wheels which are mounted upon the shaft 6, one at each side of the sprocket-wheel 5, said wheels being somewhat greater in diameter than the sprocket-wheel 5, as shown in Fig. 2.

9 indicates carrier-arms, which are arranged to receive the thongs carried by the pieces of meat. As shown in Fig. 2, the upper portions of the cylinders 7 8 rise above the table 10 of the machine slightly higher than the upper ends of the carrier-arms 9 and project beyond the end of the table to permit them to carry forward and deliver the meat into a receptacle, as explained later on.

In the apparatus illustrated in the drawings the shaft 6 is caused to rotate by a sprocket-wheel 11, driven from any suitable source of power through shafts 12 13, the shaft 12 being that upon which the sprocket-wheel 11 is mounted and being geared to the shaft 13 by beveled gears 14 15, the shaft 13 being geared to the shaft 6 by beveled gears 16 17, as shown in Fig. 1. By this construction by rotating the sprocket-wheel 11 the shaft 6 will be rotated, correspondingly rotating the sprocket-wheel 5 and cylinders 7 8 and moving the upper portion of the carrier-belt in the same direction as the upper portions of the cylinders 7 8. The sprocket-wheel 11 is so rotated as to move the upper portion of the carrier-belt 4 in the direction indicated by the arrow in Fig. 1.

18 19 indicate vertically-arranged scrubbing-brushes, one being placed at each side of the carrier-belt 4, which brushes are driven from the shaft 12 by beveled gears 20 21.

22 23 indicate horizontally-arranged brushes, which are also driven from the shaft 12 by a link belt 24, running over suitable sprocket-wheels. The apparatus for driving the brushes 18, 19, 22, and 23 may, however, be varied, and these brushes may be otherwise arranged, if desired.

25 indicates a truck placed to receive the pieces of meat as they are discharged from the washing-machine.

The operation of the apparatus above described is as follows: The pieces of meat are attached to the carrier 4 by thongs looped over the carrier-arms 9, as already suggested, and as the carrier moves in the direction indicated by the arrow in Fig. 1 they are drawn between the brushes and duly scrubbed. After passing the brushes the pieces of meat arrive at the cylinders 7 8 and by the rotation of such cylinders are carried along, being at the same time raised sufficiently to detach them from the carrier. The continued rotation of the cylinders 7 8 continues the progressive movement of the pieces of meat notwithstanding their detachment from the carrier, and they are consequently carried over the end of the machine and discharged into the truck 25 or other receptacle placed to receive them, the entire operation being automatic and positive, so that there is no liability of clogging the machine or injuring the meat.

If desired, the peripheries of the cylinders 7 8 may be roughened or provided with lugs or other suitable devices to secure a more positive engagement with the pieces of meat.

That which I claim as my invention, and desire to secure by Letters Patent, is—

1. In a meat-scrubbing machine, in combination with a frame supporting a shaft, a pulley mounted on said shaft, a carrier passed over said pulley at one end of the machine and consisting of an endless belt having arms projecting upward from the surface thereof, scrubbing devices adapted to act upon the meat, rotary cylinders of greater diameter than said pulley mounted on said shaft on opposite sides of said pulley and projecting above the ends of said arms, said cylinders being adapted to receive the meat from the carrier and to deliver the same, and means for rotating said cylinders in the direction of movement of said carrier, substantially as described.

2. In a meat-scrubbing machine, in combination with a frame supporting a shaft, a pulley mounted on said shaft, a carrier passed over said pulley at one end of the machine and consisting of an endless belt having arms projecting upward from the surface thereof, scrubbing devices adapted to act upon the meat, rotary cylinders of greater diameter than said pulley mounted on said shaft on opposite sides of said pulley and projecting above the ends of said arms, and beyond the end of the machine, said cylinders being adapted to receive the meat from the carrier and to deliver the same, and means for rotating said cylinders in the direction of movement of said carrier, substantially as described.

MAYNARD E. BROOKS.

Witnesses:
H. C. GARDNER,
JNO. C. MASSIE.